(12) United States Patent
Maruyama

(10) Patent No.: US 6,305,761 B1
(45) Date of Patent: Oct. 23, 2001

(54) TRACTION CONTROL SYSTEM FOR VEHICLE

(75) Inventor: Yutaka Maruyama, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/140,337

(22) Filed: Aug. 26, 1998

(30) Foreign Application Priority Data

Sep. 2, 1997 (JP) .................................................... 9-236897

(51) Int. Cl.[7] .................................. B60T 8/34; B60T 8/24
(52) U.S. Cl. ......................................... 303/139; 303/113.2
(58) Field of Search ............................. 303/113.2, 113.5; 701/84, 86

(56) References Cited

U.S. PATENT DOCUMENTS

| | | | |
|---|---|---|---|
| 5,025,882 | * 6/1991 | Ghoneim et al. | ..................... 180/197 |
| 5,224,044 | * 6/1993 | Tamura et al. | ................... 364/426.03 |
| 5,315,519 | * 5/1994 | Chin et al. | ....................... 364/426.02 |
| 5,340,204 | * 8/1994 | Okazaki et al. | ...................... 303/111 |
| 5,407,257 | * 4/1995 | Iwata | ................................. 303/113.2 |
| 6,002,979 | * 12/1999 | Ishizu | ..................................... 701/86 |

FOREIGN PATENT DOCUMENTS 3-109158    5/1991    (JP) .

* cited by examiner

Primary Examiner—Chris Schwartz
(74) Attorney, Agent, or Firm—Armstrong, Westerman, Hattori, McLeland & Naughton

(57) ABSTRACT

An improved traction control system for a vehicle which ensures that when a driver has performed a voluntary operation to reduce the driven wheel speed during carrying-out of a traction control, a deceleration greater than required is avoided, thereby avoiding an uncomfortable feeling provided to the driver. The improvement to the traction control system includes a control unit for stopping the traction control in response to the driver's operation to reduce the driven wheel speed during carrying-out of the traction control.

3 Claims, 5 Drawing Sheets

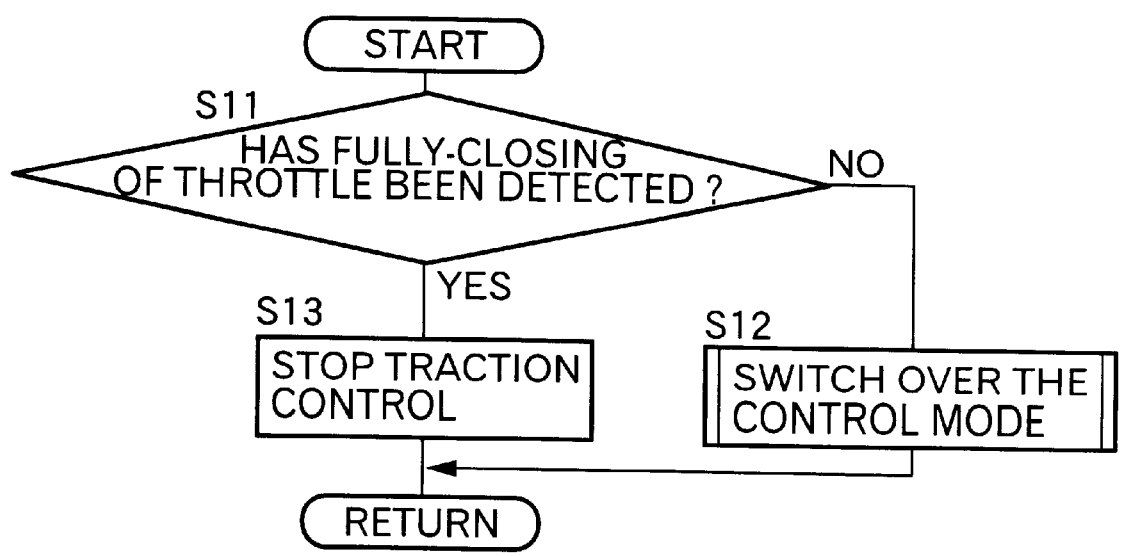

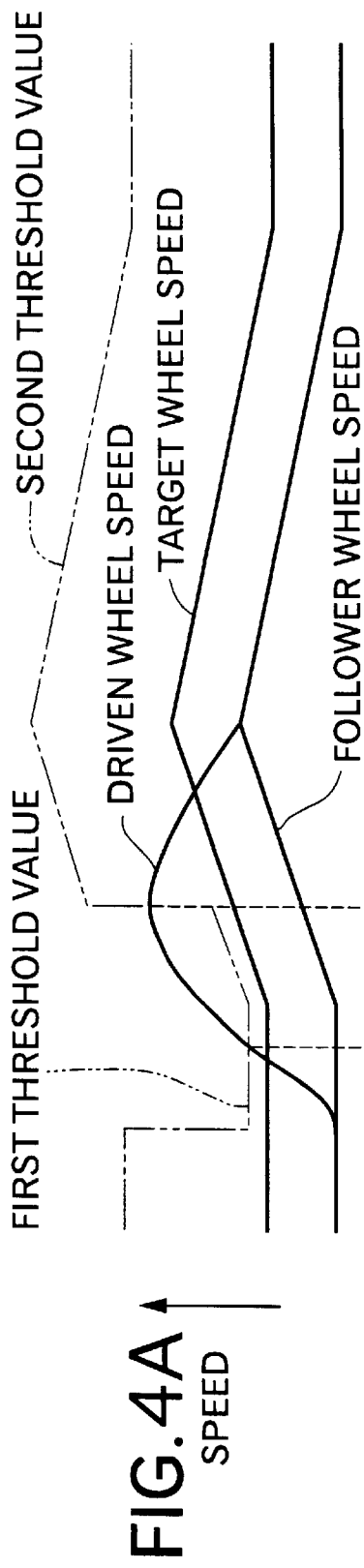
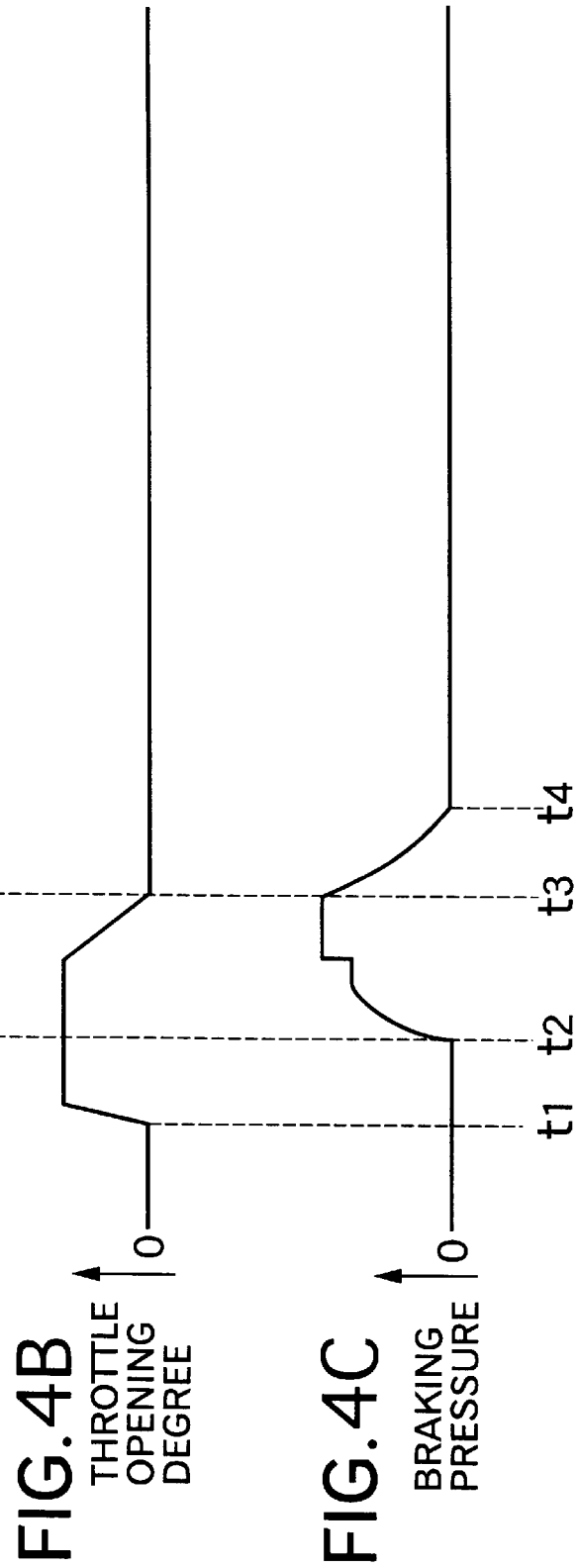

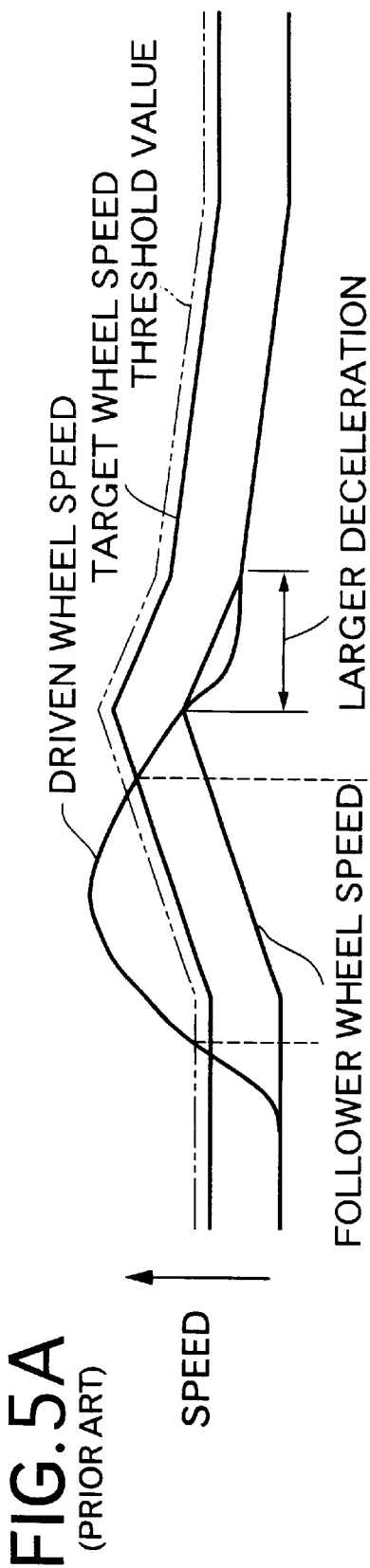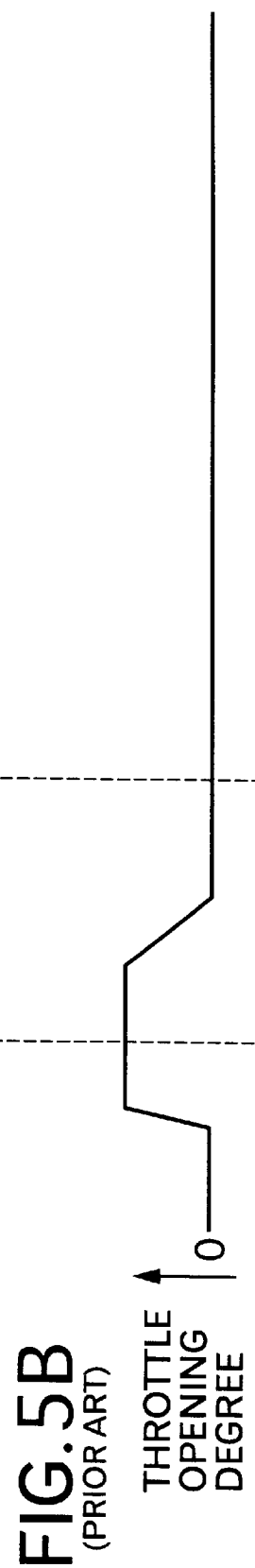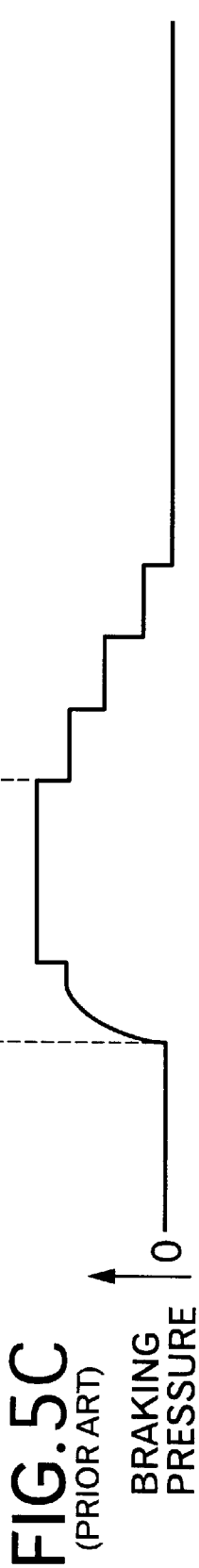
FIG.5A (PRIOR ART)
FIG.5B (PRIOR ART)
FIG.5C (PRIOR ART)

TRACTION CONTROL SYSTEM FOR VEHICLE

BACKGROUND OF THE INVENTION

1. Field of the Invention

The present invention relates to a traction control system for a vehicle capable of regulating driven wheel speeds by varying braking forces for driven wheels in accordance with excessive slipping of the driven wheels.

2. Description of the Related Art

Such a type of traction control system is conventionally known, for example, from Japanese Patent Application Laid-Open No. 3-109158. The traction control is basically utilized to converge the driven wheel speed into an optimal target wheel speed for preventing a reduction in accelerating efficiency due to excessive slipping of the driven wheels and a reduction in stability of the behavior of the vehicle body. Namely, the driven wheel speed is controlled by decreasing the engine output and by braking the driven wheels according to a difference between the target wheel speed and the driven wheel speed.

In the known traction control system, however, when the engine output is decreased by a driver's will, it cannot be definitely discriminated whether the reduction in slip rate of the driven wheels is caused by the traction control or by the driver's operation. Notwithstanding that the need for inhibiting the excessive slipping of the driven wheels has been eliminated, inappropriate traction control may be carried out, thereby providing an uncomfortable decelerating feeling to the driver.

For example, in a system designed to inhibit the excessive slipping of the driven wheels by controlling the braking pressure of a driven wheel brake, as shown in FIG. 5A, a target wheel speed is determined in consideration of a constant slip rate relative to the vehicle speed presumed based on at least the follower wheel speed, and a threshold value is determined slightly larger than such wheel speed. The braking pressure is increased as shown in FIG. 5C from the time point when the driven wheel speed exceeds the threshold value to start the traction control. However, when a throttle in an engine is brought to a fully-closed state, as shown in FIG. 5B, by the driver's will during carrying-out of the traction control, it cannot be definitely discriminated whether the reduction in slip rate due to a reduction in driven wheel speed is caused by the traction control or by the driver's operation, in spite of the fact that the reduction in driven wheel speed due to the reduction in engine output has been caused by the fully-closed value of the throttle opening degree. Therefore, the traction control based on the braking pressure is continued, whereby the braking pressure is gradually reduced after the driven wheel speed becomes less than the threshold value. For this reason, the driven wheel speed is excessively reduced relative to the follower wheel speed and hence, the deceleration of the vehicle may be increased more than necessary to provide an uncomfortable feeling to the driver.

The present invention has been accomplished with such circumstance in view, and it is an object of the present invention to provide a traction control system for a vehicle, wherein a deceleration greater than necessary is prevented from being produced, whenever a driver has acted so as to reduce the driven wheel speed during carrying-out of the traction control, thereby avoiding the uncomfortable feeling provided to the driver.

SUMMARY OF THE INVENTION

To achieve the above object, there is provided a traction control system for a vehicle including a driven wheel speed regulating means capable of regulating driven wheel speeds by varying braking forces for driven wheels in accordance with excessive slipping of the driven wheels, the traction control system comprising a detecting means for detecting that a driver has operated an engine output to reduce the driven wheel speed, and a control unit adapted to stop the traction control in response to the detecting means having detected the driver's operation to reduce the driven wheel speed during carrying-out of the traction control.

With such arrangement, when the driver has performed the operation for reducing the engine output during carrying-out of the traction control by increasing the braking liquid pressure of the driven wheel brake, the traction control is stopped. Therefore, a reduction in driven wheel speed by the traction control cannot be provided in addition to a reduction in driven wheel speed attendant on the driver's operation and hence, a deceleration providing an uncomfortable feeling to the driver can be avoided.

The control unit is arranged so that in a state in which the driver's operation to reduce the driven wheel speed is not detected by the detecting means, the traction control is started in accordance with the driven wheel speed exceeding a first threshold value set to be greater than a target wheel speed, but when the driver's operation to reduce the driven wheel speed has been detected by the detecting means, the traction control is started in accordance with the driven wheel speed exceeding a second threshold value set to be greater than the first threshold value.

In order to ensure that even if the driven wheel speed instantaneously exceeds the target wheel speed due to an unevenness of a road surface or the like, the control mode does not enter the traction control, the threshold value for determining the start of the traction control is conventionally determined to have a value greater than the target wheel speed. However, the threshold value (the second threshold value) when the driver's operation to reduce the driven wheel speed has been detected, is set to be greater than the threshold value (the first threshold value) when the driver's operation to reduce the driven wheel speed is not detected. Therefore, the start of the traction control, after being stopped in response to the detection of the driver's operation to reduce the driven wheel speed, is avoided in a state in which the driver's operation to reduce the driven wheel speed is being continued.

BRIEF DESCRIPTION OF THE DRAWINGS

FIGS. 1 to 4 show a preferred exemplary embodiment of the present invention; where:

FIG. 1 is an illustration of a drive system and a brake system in a vehicle;

FIG. 2 is a flow chart showing a procedure for starting a traction control;

FIG. 3 is a flow chart showing a procedure for stopping the traction control during carrying-out of the traction control;

FIGS. 4A to 4C are timing charts; and

FIGS. 5A to 5C are timing charts of a prior art traction control system.

DETAILED DESCRIPTION OF THE PREFERRED EMBODIMENT

The present invention will now be described by way of a preferred exemplary embodiment shown in the accompanying drawings.

Figure 1:
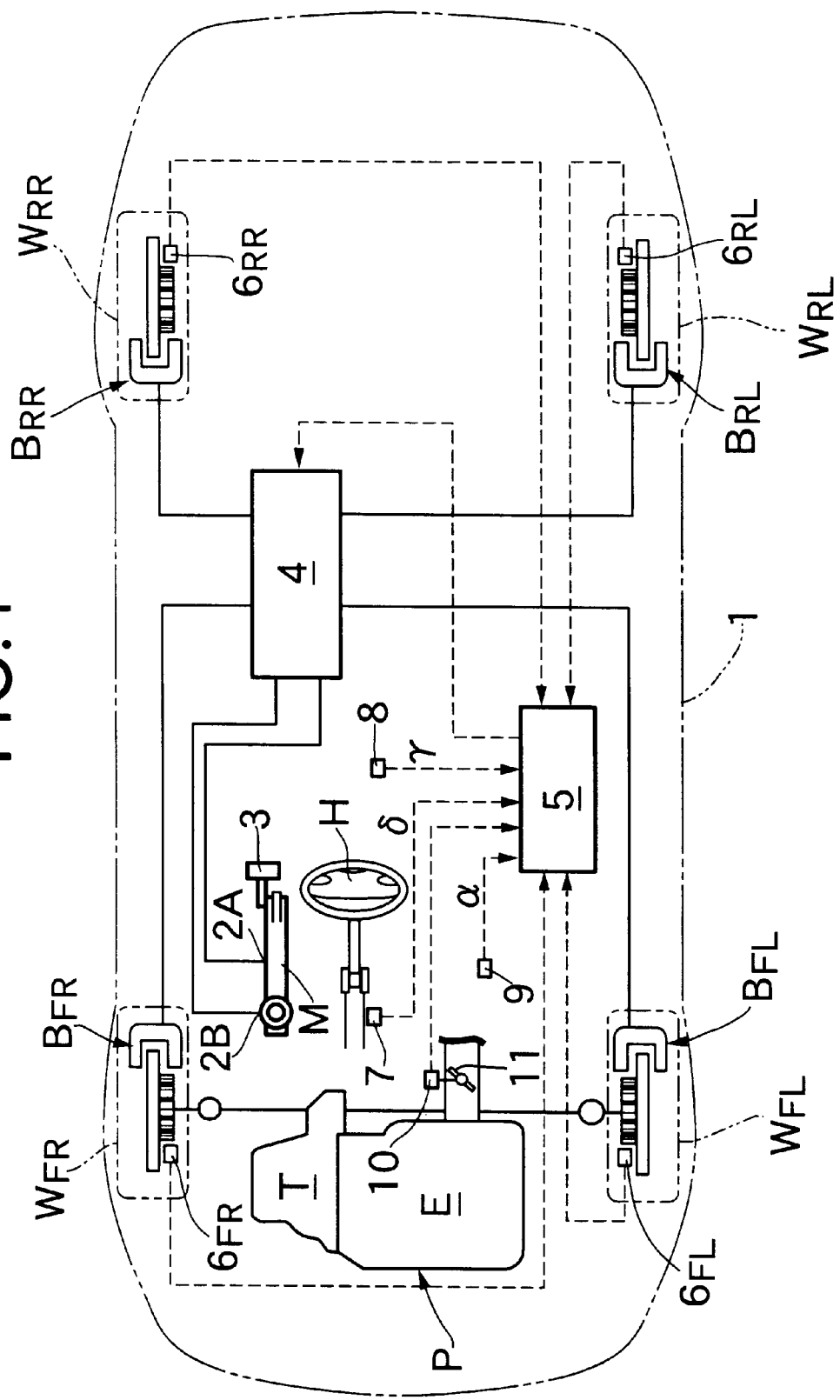

Referring first to FIG. 1, a front engine/front drive vehicle is illustrated. A power unit P comprising an engine E and a transmission T is mounted at a front portion of a vehicle body 1 to drive left and right front wheels $W_{FL}$ and $W_{FR}$ which are left and right driven wheels. Left and right front wheel brakes $B_{FL}$ and $B_{FR}$ are mounted on the left and right front wheels $W_{FL}$ and $W_{FR}$, and left and right rear wheel brakes $B_{RL}$ and $B_{RR}$ are mounted on left and right rear wheels $W_{RL}$ and $W_{RR}$, which are left and right follower wheels. Wheel brakes $B_{FL}$, $B_{FR}$, $B_{RL}$ and $B_{RR}$ are, for example, disk brakes.

A braking liquid pressure corresponding to the operation of depression of a brake pedal 3 is outputted from first and second output ports 2A and 2B provided in a tandem-type master cylinder M. The first and second output ports 2A and 2B are connected to a braking liquid pressure control device 4 as a driven-wheel speed regulating means, so that the braking liquid pressure from the braking liquid pressure control device 4 is applied to the wheel brakes $B_{FL}$, $B_{FR}$, $B_{RL}$ and $B_{RR}$. In the braking liquid pressure control device 4, the braking liquid pressure applied to each of the wheel brakes $B_{FL}$, $B_{FR}$, $B_{RL}$ and $B_{RR}$ is regulated by the control of a control unit 5. Inputted to the control unit 5 are detection values which are detected by wheel speed sensors $6_{FL}$, $6_{FR}$, $6_{RL}$ and $6_{RR}$ for detecting wheel speeds of the wheels $W_{FL}$, $W_{FR}$, $W_{RL}$ and $W_{RR}$, respectively, a steering angle sensor 7 for detecting a steering angle δ resulting from the operation of a steering wheel H, a yaw rate sensor 8 for detecting a yaw rate γ of the vehicle, and a lateral acceleration sensor 9 for detecting a lateral acceleration a of the vehicle, and a signal from a throttle opening degree sensor 10 as a detecting means for detecting the fact that a driver has operated an engine output to reduce the driven wheel speeds. The throttle opening degree inputs, to the control unit 5, a signal indicative of the fact that the driver has operated a throttle valve 11 of the engine E into a fully-closed state.

The control unit 5 is capable of carrying out: (1) an antilock brake control for controlling the braking liquid pressures for the wheel brakes $B_{FL}$, $B_{FR}$, $B_{RL}$ and $B_{RR}$ to eliminate the locking of the wheels during a braking operation; (2) a traction control for controlling the braking liquid pressures for the left and right front wheel brakes $B_{FL}$ and $B_{FR}$ which are mounted on the left and right front wheels $W_{FL}$ and $W_{FR}$ which are driven wheels, thereby inhibiting the generation of excessive slipping of the left and right front wheels $W_{FL}$ and $W_{FR}$ during non-braking; and (3) a directional stability control for controlling the braking liquid pressures for the left and right front wheel brakes $B_{FL}$ and $B_{FR}$ irrespective of whether during the braking and non-braking operations to control the yaw motion of the vehicle.

In order to carry out the traction control, a target wheel speed for the driven wheels $W_{FL}$ and $W_{FR}$ is set in consideration of a constant slip rate in addition to a vehicle speed presumed based on the wheel speeds of the follower wheels $W_{RL}$ and $W_{RR}$. When the traction control is being carried out by the control unit 5, the operation of the braking liquid pressure control device 4 is controlled by the control unit 5, so that the braking liquid pressure for the left and right front wheel brakes $B_{FL}$ and $B_{FR}$ is varied by the braking liquid pressure control device 4, in order to converge the front wheel speeds, i.e., the driven wheel speeds to the target driven wheel speed in the wheel speed sensors $6_{FL}$ and $6_{FR}$.

Figure 2:
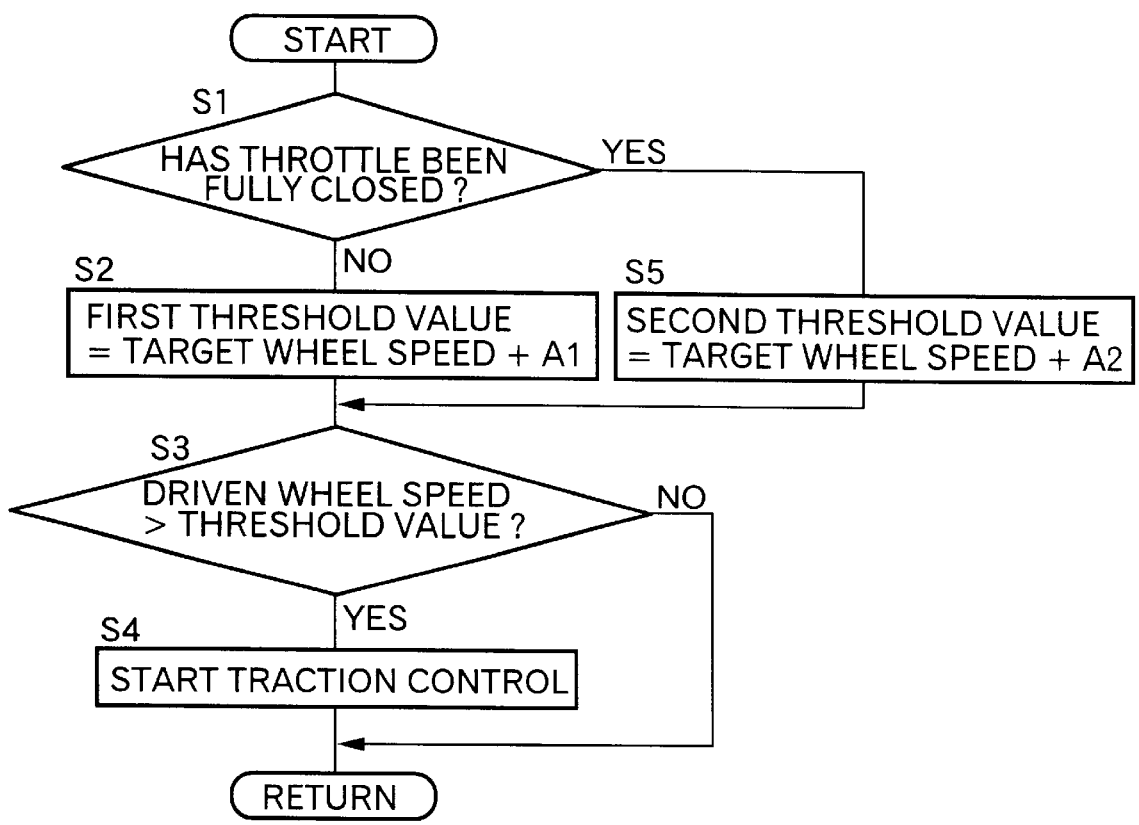

A procedure for starting the traction control is established in the control unit 5, as shown in FIG. 2. At Step S1, it is determined whether the throttle opening degree sensor 10 has inputted a signal indicative of the fact that the throttle valve is in its fully-closed state. When the throttle valve is not in its fully-closed state, a first threshold value is determined as (the target wheel speed+A1) at Step S2. The first threshold value is set to be greater than the target wheel speed by an offset amount A1 in order to ensure that even if the driven wheel speed instantaneously exceeds the target wheel speed due to an unevenness of a road surface or the like, the traction control is not initiated. The offset amount A1 is set, for example, in a range of about 2 to 5 km/hr.

At Step S3, it is determined whether the driven wheel speed exceeds the threshold value. If it is determined that the driven wheel speed exceeds the first threshold value, when the first threshold value has been set, then the traction control is started at Step S4.

If it is determined at Step S1 that the throttle valve is in the fully-closed state, based on the fact that the signal indicative of the fully-closed state has been inputted from the throttle opening degree sensor 10, then the processing is advanced from Step S1 via Step S5 to Step S3. At Step S5, a second threshold value is determined as (the target wheel speed+A2). The offset amount A2 is set to be greater than the offset amount A1, and the second threshold value is set to be greater than the first threshold value. Therefore, when the driver's operation to reduce the driven wheel speed, i.e., the operation of the throttle value to the fully-closed state is detected by the throttle opening degree sensor 10, the traction control is started in accordance with the driven wheel speed exceeding the second threshold value greater than the first threshold value. Moreover, the offset amount A2 is set at a value (e.g., 10 to 15 km/hr or more) which is sufficiently greater than a difference between the target wheel speed and the driven wheel speed estimated when the driver operates the throttle to the fully-closed state during carrying-out of the traction control, and which ensures that the traction control is not initiated again.

A procedure for stopping the control during the carrying-out of the traction control is established in the control unit 5, as shown in FIG. 3. More specifically, when it is confirmed at Step S11 that the driver's operation to reduce the driven wheel speed, i.e., the operation of the throttle valve to the fully-closed state is not detected by the throttle opening degree sensor 10, the usual traction control is continued at Step S12 in such a manner that an increasing mode, a maintaining mode and a decreasing mode for the braking liquid pressure are determined. When the throttle opening degree sensor 10 has detected the operation of the throttle value to the fully-closed state, the traction control is forcibly stopped at Step S13.

The operation of the embodiment will be described with reference to FIG. 4. The target wheel speed is varied in accordance with a variation in follower wheel speed, as shown in FIG. 4A. It is supposed that the driven wheel speed has been increased more than the follower wheel speed in accordance with a variation in throttle opening degree from the fully-closed value to an increased value by the driver's operation to accelerate the vehicle at a time point t1. In this case, at a time point t2 when the driven wheel speed has exceeded the first threshold value set based on the fact that the throttle valve is not in the fully-closed state, the traction control is started due to an increase in braking pressure, as shown in FIG. 4C. When the traction control is being carried out, the traction control is forcibly stopped at a time point t3 when the throttle opening degree is brought into the fully-closed value by a driver's will, and the braking pressure is reduced down to "0" at a time point t4 after a relatively small amount of time has elapsed from the time point t3. Therefore, a reduction in driven wheel speed due to the traction control, in addition to a reduction in driven wheel speed caused by the driver's operation, cannot be added, and the driven wheel speed and the follower wheel speed are reduced with a reduction in engine output by the driver's will. Thus, a deceleration providing an uncomfortable feeling to the driver cannot be produced.

Moreover, at the time point t3 when the throttle fully-closed state has been detected, the threshold value for determining the start of the traction control is switched over from the first threshold value to the second threshold value. Since the second threshold value is set to be greater than the first threshold value, starting of the traction control again after stopping of the traction control attendant on the detection of the throttle fully-closed state is avoided unless the throttle opening degree is increased by the driver's will.

As discussed above, when the driver has performed the operation to reduce the driven wheel speed during carrying-out of the traction control, the traction control is stopped. Thus, it is possible to prevent the generation of the deceleration providing an uncomfortable feeling to the driver.

In the state in which the driver's operation to reduce the driven wheel speed is being continued after the traction control has been stopped in response to the detection of the driver's operation to reduce the driven wheel speed, restarting of the traction control can be avoided.

Although a preferred exemplary embodiment of the present invention has been described in detail, it will be understood that the present invention is not limited to the above-described embodiment, and various modifications in design may be made without departing from the subject matter of the present invention defined in claims.

For example, in the preferred exemplary embodiment, the throttle opening degree sensor 10 for detecting the throttle fully-closed value has been used as the detecting means for detecting the fact that the driver has operated the engine output to reduce the driven wheel speed. However, any of a means for detecting the depression of an accelerator pedal, and a means for detecting a closing speed of the throttle or a depressing speed of the accelerator pedal, may be used.

What is claimed is:

1. An improved traction control system for a vehicle, including a driven wheel speed regulating means capable of regulating driven wheel speeds by varying braking forces for driven wheels in accordance with excessive slipping of the driven wheels, the improvement comprising:

a detecting means for detecting that a driver has operated an engine output to reduce the driven wheel speed; and a control unit which controls to stop a traction control in response to said detecting means having detected the driver's operation to reduce the driven wheel speed during carrying-out of the traction control wherein said control unit is arranged such that in a state in which the driver's operation to reduce the driven wheel speed is not detected by the detecting means, the traction control is started in accordance with the driven wheel exceeding a first threshold value set to be greater than a target wheel speed, but when the driver's operation to reduce the driven wheel speed has been detected by the detecting means, the traction control is started in accordance with the driven wheel speed exceeding a second threshold value set to be greater than the first threshold value.

2. The improved traction control system recited in claim 1, wherein said detecting means comprises a throttle opening degree sensor for detecting a throttle opening degree.

3. A method for performing traction control in a traction control system for a vehicle including a driven wheel speed regulation means capable of regulating driven wheel speeds by varying braking forces for driven wheels in accordance with excessive slipping of the driven wheels, comprising the steps of:

detecting whether or not a driver has operated an engine output to reduce the driven wheel speed;

controlling the operation of a traction control according to the result of the detecting step; and stopping the traction control in response to the driver having operated the engine output to reduce the driven wheel speed, wherein said controlling step includes starting the traction control and this starting step is carried out when it is detected that the driver has not operated the engine output to reduce the driven wheel speed and the driven wheel speed exceeds a first threshold value set to be greater than a target wheel speed or when it is detected that the driver has operated the engine output to reduce the driven wheel speed and the driven wheel speed exceeds a second threshold value set to be greater than the first threshold value.

* * * * *